United States Patent [19]
Stephenson et al.

[11] Patent Number: 5,186,211
[45] Date of Patent: Feb. 16, 1993

[54] FLUID CONTROLLED HAVING VARIABLE ANCILLARY CONTROL FUNCTIONS

[75] Inventors: Dwight B. Stephenson, Savage; Keith R. Carlson, Victoria; Kenneth G. Rasmussen, Maple Grove, all of Minn.

[73] Assignee: Eaton Corporation, Cleveland, Ohio

[21] Appl. No.: 877,001

[22] Filed: May 1, 1992

Related U.S. Application Data
[63] Continuation-in-part of Ser. No. 703,318, May 20, 1991, Pat. No. 5,115,640.

[51] Int. Cl.⁵ ............................................... F15B 13/02
[52] U.S. Cl. .................................. 137/625.24; 60/384; 91/467
[58] Field of Search ............................ 60/384; 91/467; 137/624.24

[56] References Cited
U.S. PATENT DOCUMENTS
5,080,135  1/1992  Stephenson .................. 137/625.24

*Primary Examiner*—Gerald A. Michalsky
*Attorney, Agent, or Firm*—L. J. Kasper

[57] ABSTRACT

A hydrostatic power steering device (11;111) is provided of the type including a primary, spool valve (35;135), and a follow-up, sleeve valve (37;137). During normal operation, relative rotation of the spool and sleeve define one or more variable flow control orifices (A1, A5; AN; A1) and these orifices have a first area versus deflection relationship when the sleeve is biased to its first position (FIG. 5; FIG. 10). The sleeve may be moved toward a second position (FIG. 6; FIG. 11) in response to an input (95, 99) other than rotation of the vehicle steering wheel. In the second axial position of the sleeve, the flow control orifice has a different area versus deflection relationship, the difference providing a useful steering or ancillary function.

16 Claims, 10 Drawing Sheets

FLUID CONTROLLED HAVING VARIABLE ANCILLARY CONTROL FUNCTIONS

CROSS REFERENCE TO RELATED APPLICATION

This application is a Continuation-In-Part (CIP) of co-pending application U.S. Ser. No. 703,318, filed May 20, 1991, now U.S. Pat. No. 5,185,640, in the name of James J. Hastreiter and Dwight B. Stephenson for an "IMPROVED FLUID CONTROLLER AND LOGIC CONTROL SYSTEM FOR USE THEREWITH".

BACKGROUND OF THE DISCLOSURE

The present invention relates to hydrostatic power steering devices of the type used to control the flow of fluid from a source of pressurized fluid.

The present invention may be used in connection with various types of hydrostatic power steering devices, including fluid controllers of the type used to control the flow of fluid to a fluid pressure actuated device, such as a steering cylinder which comprises part of a full-fluid-linked vehicle steering system. The invention may also be utilized in connection with a torque-generating device of the type wherein a relatively low-torque steering input results in a relatively high-torque output, which then serves as a Power input to a mechanical steering device, such as a rack and pinion steering system.

A typical steering device of the type to which the present invention relates includes a housing which defines various fluid ports, and further includes a fluid meter, a valve means, and an arrangement for imparting follow-up movement to the valve means, in response to the flow of fluid through the fluid meter. Typically, the valve means of such devices includes Primary (spool) and follow-up (sleeve) valve members, which are displaced (deflected) relative to each other by rotation of the vehicle steering wheel to define variable flow control orifices therebetween. The flow through the steering device is generally proportional to the area of the variable flow control orifices, with the area of the orifices in turn being proportional to the rate at which the steering wheel is rotated, and therefore, proportional to the rotational displacement between the spool and sleeve.

Although the typical steering devices of the type described above have performed in a generally satisfactory manner, and have been commercially successful for a number of years, the above-described relationship between flow control orifice area and rotational displacement between the spool and sleeve have somewhat limited the capability of such devices. For example, it has typically not been possible to control or vary any of the individual steering functions in response to any input, other than steering wheel rotation. By way of example only, it would be desirable in certain vehicle applications to have the load reaction capability of a fluid controller increase with increasing vehicle speed, and/or to have the aggressiveness (gain rate) of the steering decrease with increasing vehicle speed.

SUMMARY OF THE INVENTION

Accordingly, it is an object of the present invention to provide a hydrostatic power steering device in which one or more of the steering functions is variable, or controllable, in response to an input other than merely steering wheel rotation.

The above and other objects of the present invention are accomplished by the provision of a hydrostatic power steering device operable to control the flow of fluid from a source of pressurized fluid, the device being of the type including housing means defining an inlet port for connection to the source of fluid, and a return port. Valve means is disposed in the housing means and comprises a primary, rotatable valve member and a cooperating, relatively rotatable follow-up valve member. The primary and follow-up valve members define a neutral rotary position and a rotary operating position in which the primary valve member is rotatably displaced, or deflected, from the neutral rotary position, relative to the follow-up valve member. The housing means and the valve means cooperate to define a main fluid path communicating between the inlet port and the return port when the valve members are in the rotary operating position. Fluid actuated means imparts follow-up movement to the follow-up valve member in response to the flow of fluid therethrough, the fluid actuated means being disposed in series flow relationship in the main fluid path. The follow-up valve member defines a first axial position. The primary valve member defines fluid passage means, and the follow-up valve member defines fluid port means, the fluid passage means and the fluid port means being disposed to define a variable flow control orifice having a first orifice area versus valve deflection relationship as the primary and follow-up valve members are displaced between the neutral rotary position and the rotary operating position, when the follow-up valve member is in the first axial position.

The device is characterized by means operable to bias the follow-up valve member toward the first axial Position, and means operable to displace the follow-up valve member from the first axial position toward a second axial position. One of the fluid passage means and the fluid port means are configured such that the variable flow control orifice has a second orifice area versus deflection relationship as the primary and follow-up valve members are displaced between the neutral rotary position and the rotary operating position, when the follow-up valve member is in the second axial position.

DESCRIPTION OF THE PREFERRED EMBODIMENTS

Figure 1:
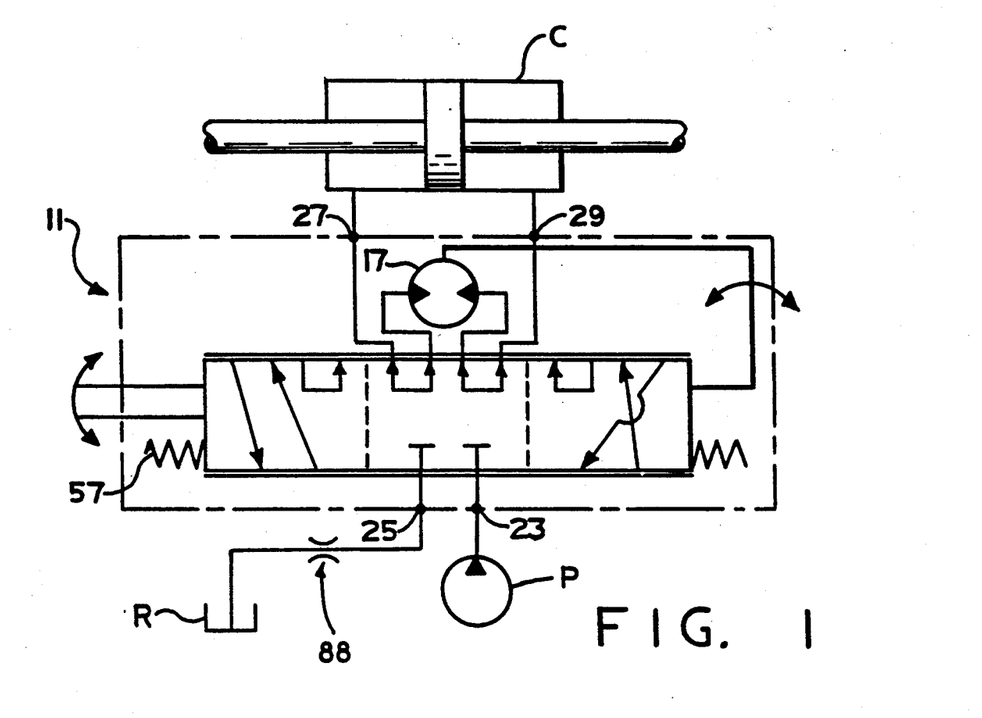
FIG. 1 is a simplified schematic of a hydrostatic Power steering system of the type to which the present invention relates.

Referring now to the drawings, which are not intended to limit the invention, FIG. 1 is a simplified hydraulic schematic of a hydrostatic power steering system including a fixed displacement fluid pump P directing pressurized fluid to a vehicle steering cylinder C, under the control of a fluid controller, generally designated 11. The schematic of FIG. 1 will be referred to subsequently, in connection with the detailed description of the fluid controller 11 and its valving.

The fluid controller may be of the type illustrated and described in U.S. Pat. No. Re. 25,126, assigned to the assignee of the present invention and incorporated herein by reference. The subject embodiment is more specifically of the type illustrated and described in U.S. Pat. No. 5,016,672, also assigned to the assignee of the present invention and incorporated herein by reference. However, the present invention differs substantially from the above-cited patents, as will be described in greater detail subsequently, primarily in connection with the description of the controller valving in FIGS. 3 through 8.

The fluid controller 11 comprises several sections, including a valve housing section 13, a wear plate 15, a section comprising a fluid meter 17, and an end cap 19. These sections are held together in tight sealing engagement by means of a plurality of bolts 21, which are in threaded engagement with the valve housing section 13. The valve housing section defines a fluid inlet port 23, a fluid return port 25, a pair of control (cylinder) fluid ports 27 and 29, and a load sensing fluid port 31 (shown only in dotted lines in FIG. 2).

Figure 2:
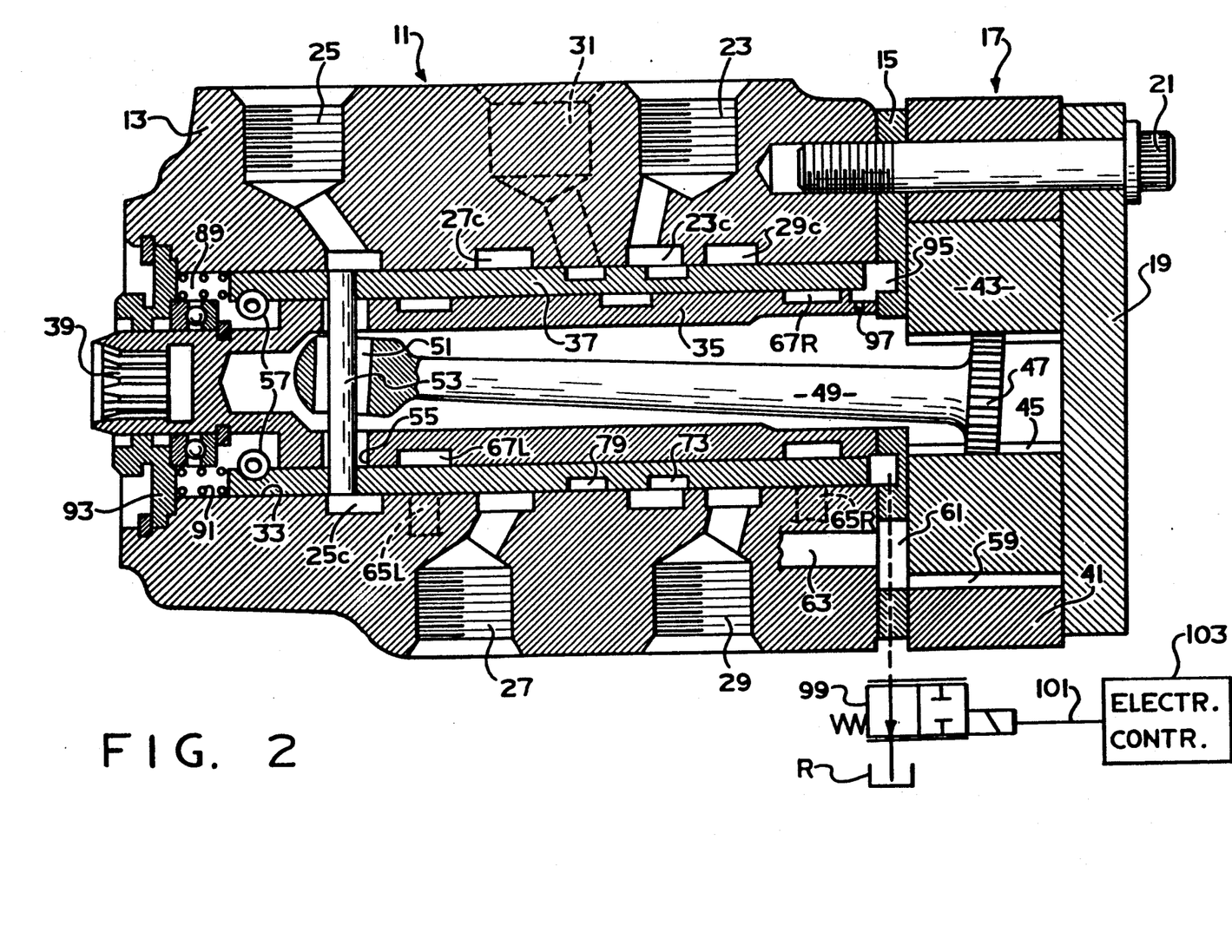
FIG. 2 is an axial cross-section of a fluid controller made in accordance with the present invention.

The valve housing section 13 also defines a valve bore 33, and rotatably disposed therein is the controller valving which comprises a primary, rotatable valve member 35 (also referred to hereinafter as the "spool"), and a cooperating, relatively rotatable follow-up valve member 37 (also referred to hereinafter as the "sleeve"). At the forward end of the spool 35 is a set of internal splines 39 which provide for direct mechanical connection between the spool 35 and a vehicle steering wheel (not shown herein). The spool 35 and the sleeve 37 will be described in greater detail subsequently.

The fluid meter 17 may be of the type well known in the art, and in the subject embodiment, includes an internally-toothed ring member 41, and an externally-toothed star member 43. The star member 43 is eccentrically disposed within the ring member 41, for orbital and rotational movement relative thereto. The star member 43 defines a set of internal splines 45, and in splined engagement therewith is a set of external splines 47 formed at the rearward end of a main drive shaft 49, which has a bifurcated forward end 51. The forward end 51 permits driving connection between the shaft 49 and the sleeve 37, by means of a drive pin 53. In the subject embodiment, it is preferable for the bifurcated forward end 51 to define an enclosed opening, rather than the conventional, open-ended arrangement used commercially by the assignee of the present invention, thus providing a greater total torque transmitting capability through the shaft 49 and pin 53. The ends of the pin 53 pass through a pair of pin openings 55 defined by the spool 35, and are received in relatively close fit openings in the sleeve 37.

As is well known to those skilled in the art, pressurized fluid flows through the various passages and Ports defined by the spool 35 and sleeve 37, then flows through the fluid meter 17, causing orbital and rotational movement of the star 43, within the ring 41. Such movement of the star 43 causes rotational follow-up movement of the sleeve 37, by means of the drive shaft 49 and drive pin 53, to maintain a particular relative displacement (deflection) between the spool 35 and sleeve 37. The particular relative displacement (referred to hereinafter as a "rotary operating position"), is generally proportional to the rate of rotation of the steering wheel, i.e., the rate of rotation of the spool 35.

Referring still to FIG. 2, disposed adjacent the forward end (left end in FIG. 2) of the spool 35 and the sleeve 37, is a neutral centering spring arrangement, represented in FIG. 2 by a portion of a coiled compression spring 57. The spring arrangement may be of the type illustrated and described in greater detail in co-pending application U.S. Ser. No. 793,061, filed Nov. 15, 1991, in the name of Dwight B. Stephenson for a "FLUID CONTROLLER HAVING ROTARY/AXIAL VALVING, AND SPRING ARRANGEMENT THEREFOR", assigned to the assignee of the present invention and incorporated herein by reference. Typically, the spring arrangement would include one, two, or perhaps three of the coiled springs 57, the function of which is to bias the sleeve 37 toward a "neutral rotary position" (as that term will be defined in connection with FIG. 3), relative to the spool 35.

The valve bore 33 of the valve housing section 13 defines a plurality of annular fluid chambers surrounding the sleeve 37, to provide fluid communication between the various ports (23 through 31) and the outer surface of the sleeve 37. An annular chamber 23c receives pressurized fluid from the inlet port 23, while an annular chamber 25c communicates return fluid to the return port 25. Annular chambers 27c and 29c provide fluid communication to and from the control ports 27 and 29, respectively.

The toothed interaction of the star 43, orbiting and rotating within the ring 41, defines a plurality of expanding and contracting fluid volume chambers 59, and adjacent each such chamber 59, the wear plate 15 defines a fluid port 61. The valve housing section 13 defines a plurality of axial bores 63 (only one of which is shown in FIG. 2), each of which is in open communication with one of the fluid ports 61. The valve housing 13 further defines a pair of radial bores 65L and 65R, providing communication between each of the axial bores 63 and the valve bore 33, for purposes which are well known to those skilled in the art, and will be described in greater detail subsequently.

It is believed that the general operation of the fluid controller 11 is well known to those skilled in the art. As the steering wheel is rotated, for example, in a clockwise direction, to achieve a right turn of the vehicle, the spool 35 is also rotated clockwise, as viewed by the vehicle operator, opening a series of variable flow control orifices between the spool 35 and the sleeve 37. These orifices permit fluid communication from the annular chamber 23c through the valving, then through the radial bores 65R and some of the axial bores 63 to the expanding volume chambers 59 of the fluid meter 17. Fluid flowing from the contracting volume chambers of the meter 17 ("metered fluid") flows through the other of the axial bores 63, then through the radial bores 65L, and through the valving, then out through the annular chamber 27c to the cylinder port 27. Fluid returning from the steering cylinder enters the cylinder port 29, then flows through the annular chamber 29c, through the valving, and then out through the annular chamber 25c, then to the return Port 25.

VALVING ARRANGEMENT

Figure 3:
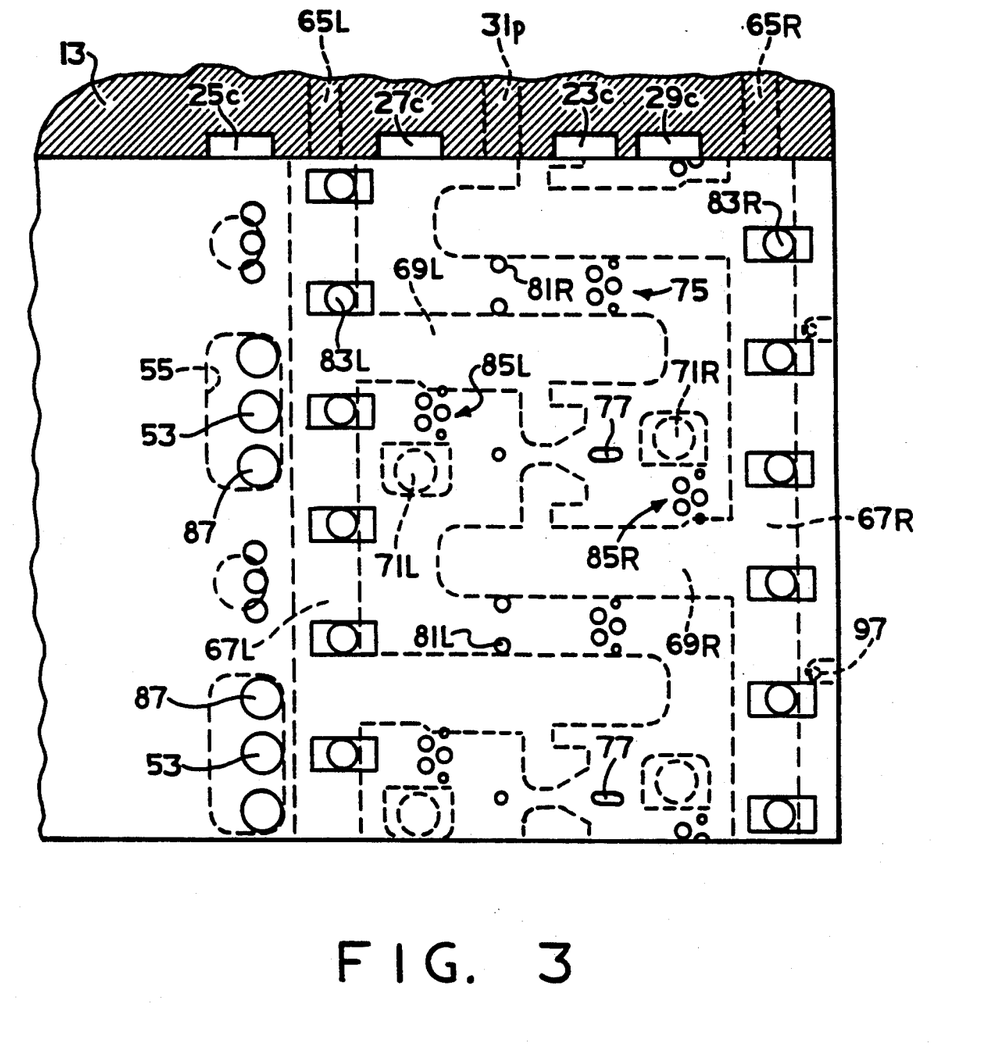
FIG. 3 is an overlay view of the valving of the fluid controller shown in FIG. 2, on approximately the same scale as FIG. 2, with the valving being in its neutral position.

Referring now primarily to FIG. 3, the spool 35 and sleeve 37 will be described in greater detail, with regard to the various ports and passages defined thereby. In connection with the subsequent description, it should be noted that many of the ports and passages are arranged symmetrically, or generally symmetrically with respect to the annular chamber 23c, and such elements will be described by a reference numeral, followed by either an "L" or an "R", to indicate that the element is located on either the left side or the right side, respectively, of the chamber 23c. On the other hand, certain of the other elements are either centered relative to the chamber 23c, or, although not centered, do not have a corresponding element oppositely disposed about the chamber 23c, and will be referred to by use of a reference numeral alone.

The spool 35 defines a pair of annular meter grooves 67L and 67R. In open communication with the meter groove 67L is a pair of axially-extending operating passages 69L and similarly, in open communication with the meter groove 67R is a pair of axially-extending operating passages 69R. Finally, the spool 35 defines a Pair of tank ports 71L and a pair of tank ports 71R, all of which open into the interior of the spool 35.

The sleeve 37 defines an annular pressure groove 73 (shown only in FIG. 2) which is in continuous fluid communication with the annular chamber 23c. In communication with the groove 73, the sleeve 37 also defines a pair of groups of pressure ports, each generally designated 75, and a pair of by-pass pressure ports 77. The sleeve 37 further defines an annular load sensing groove 79 (also shown only in FIG. 2). In communication with the groove 79, the sleeve 37 also defines two pairs of load sensing bores 81L and 81R, the function of which is not an essential part of the Present invention, is well known to those skilled in the art, and will not be described further herein. It should be noted that, for simplicity, the schematic of FIG. 1 does not include load signal lines, or a load responsive control on the pump P, etc., but because the load sensing version is considered the preferred embodiment of the invention, such is shown in the detailed drawings of FIGS. 2 through 8.

The sleeve 37 defines a plurality of meter ports 83L, disposed for commutating fluid communication with the bores 65L, and a plurality of meter ports 83R, disposed for commutating fluid communication with the bores 65R, in a manner now well known to those skilled in the art. It should be noted that in FIG. 3, each of the meter ports 83L and 83R is illustrated as surrounded by a rectangular opening. It is important to note that the rectangular openings are disposed on the outer surface of the sleeve 37, and therefore, are shown only in FIG. 3, in view of the fact that the spool-sleeve overlay views are generally intended to shown only features at the interface of the spool and sleeve. The rectangular openings surrounding the meter ports are required so that the commutating fluid communication described previously can occur, even as the sleeve 37 is displaced axially relative to the housing 13, as will be described in greater detail subsequently.

The sleeve 37 defines two groups of operating ports 85L and two groups of operating ports 85R, the groups of operating ports 85L and 85R being in continuous fluid communication with the annular chambers 27c and 29c, respectively. Finally, the sleeve 37 defines a pair of tank ports 87, disposed circumferentially on either side of each end of the drive pin 53, the tank ports 87 being in continuous fluid communication with the annular chamber 25c. In the subject embodiment, there is preferably some sort of control or restriction in the return line downstream of the return port 25, illustrated schematically in FIG. 1 as a fixed orifice 88, whereby the fluid pressure disposed within the interior of the spool 35 is a pressure which may be referred to as "regulated tank", as that term is now well known to those skilled in the art, the function of the regulated tank pressure to be described subsequently.

Referring again to FIG. 2, the forward end of the sleeve 37 cooperates with an adjacent portion of the housing 13 to define a spring chamber 89, and disposed therein is a plurality of coiled, compression springs 91, seated against a bearing retainer 93, and biasing the sleeve 37 rearwardly (to the right in FIG. 2). The spring arrangement just described is illustrated and described in greater detail in above-incorporated U.S. Ser. No. 793,061.

The right end of the sleeve 37 cooperates with the housing 13 and the wear plate 15 to define a pressure chamber 95, into which the regulated tank pressure is communicated through a small radial hole 97 in the spool 35. The function of the fluid pressure in the pressure chamber 95 is to modulate the axial position of the sleeve 37, in opposition to the biasing force of the spring 91. This can be accomplished, for example, by means of a pilot control valve 99 which controls fluid communication between the pressure chamber 95 and the true system reservoir R (i.e., not the "regulated tank" discussed previously). The pilot control valve 99 is positioned in response to an electrical signal 101 from an electronic controller 103.

Figure 6:
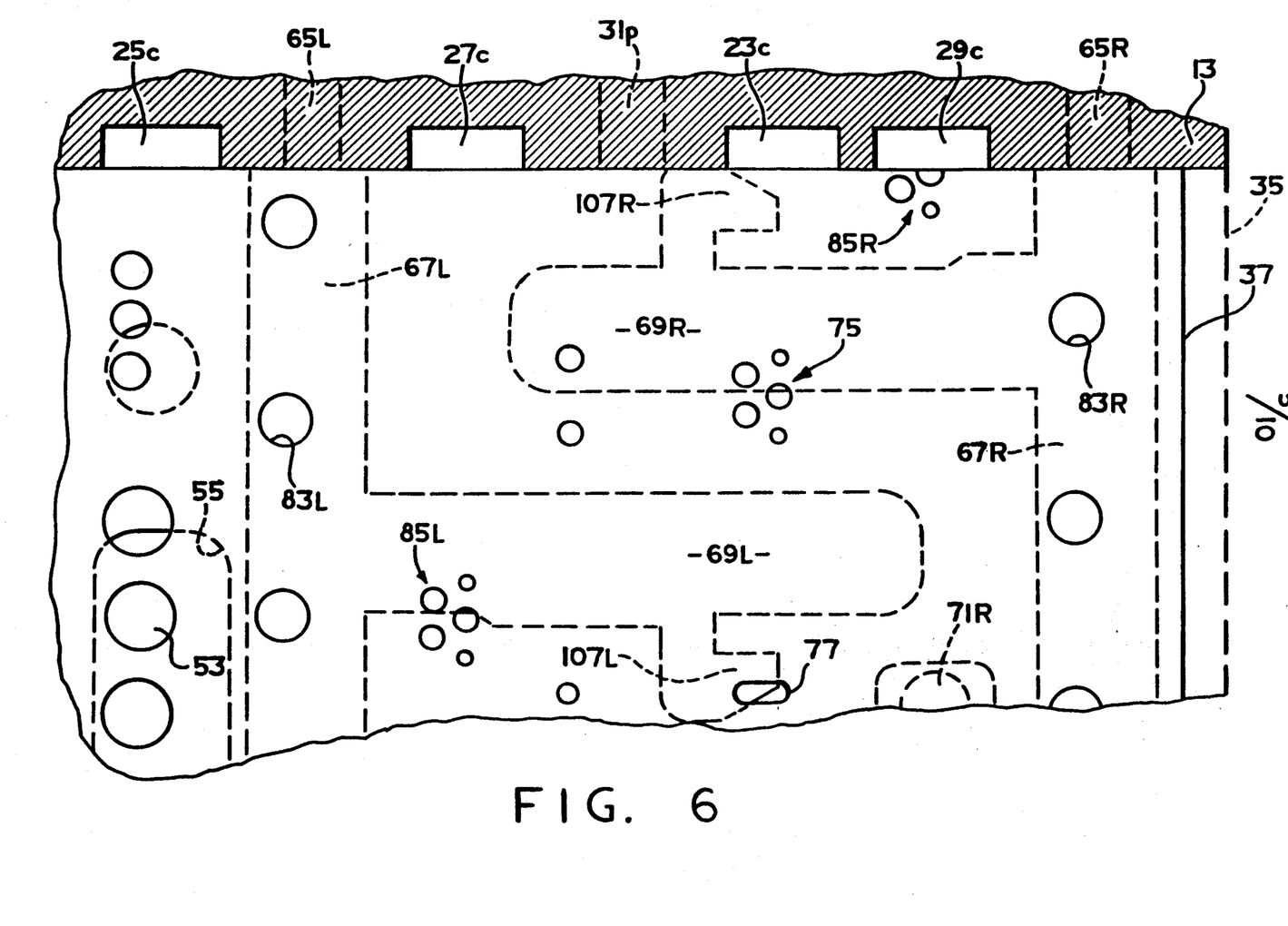
FIG. 6 is a further enlarged, fragmentary, overlay view with the valving displaced in both the rotary and axial directions.

In the subject embodiment, the pilot valve 99 is normally biased toward a position communicating pressure from the chamber 95 to the system reservoir R, such that the springs 91 bias the sleeve 37 toward the position shown in FIG. 3. If a signal 101 is transmitted to the valve 99, it moves toward a position restricting or blocking communication from the chamber 95 to the reservoir R, thus increasing pressure in the chamber 95 and biasing the sleeve 37 toward a second axial position, such as is shown in FIG. 6. In regard to some of the steering functions to be described subsequently, the control of the axial position of the sleeve 37 may be of the "bang-bang" type, i.e., wherein the sleeve has either of two distinct, discrete positions. For other functions, it may be desirable to control the position of the sleeve 37 in a proportional manner, for example, with the movement of the sleeve 37 away from its first axial position (FIG. 3) toward its second axial position (FIG. 6) being proportional to a sensed parameter such as vehicle speed.

VARIABLE LOAD REACTION

Figure 4:
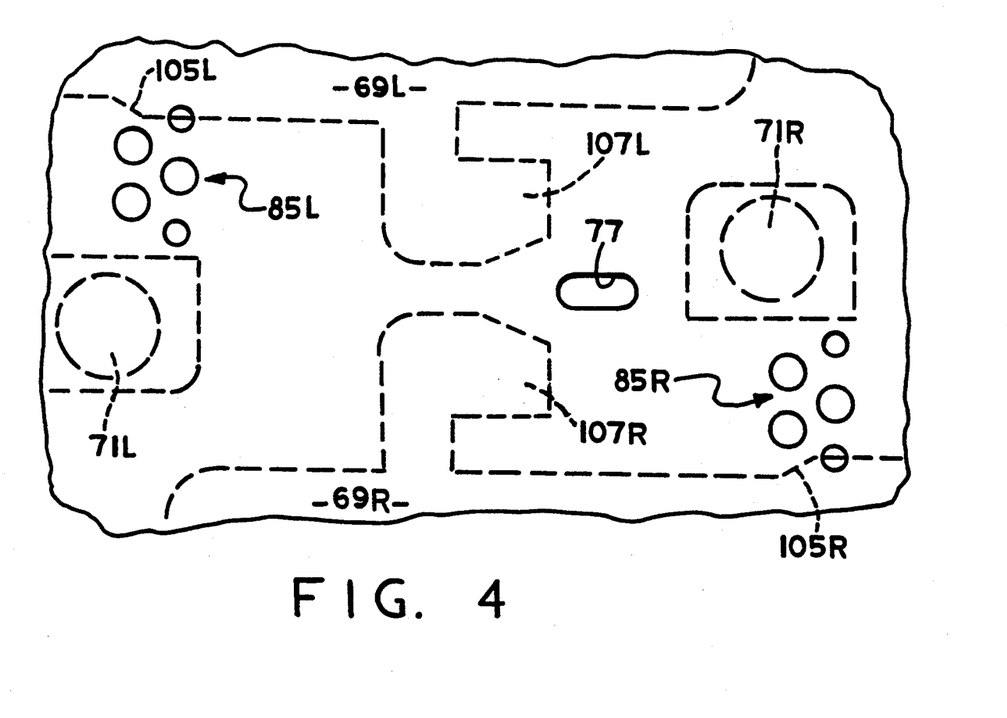
FIG. 4 is a greatly enlarged, fragmentary, overlay view, similar to FIG. 3, illustrating the variable load reaction feature of the present invention.

Referring now primarily to FIG. 4, there is an enlarged fragmentary view similar to FIG. 3, with the spool 35 and sleeve 37 in the rotary neutral position, as in FIG. 3, and with the sleeve biased to the right in FIGS. 2 through 4, to its "first" axial position.

As is now well known to those skilled in the art, the "load reaction" of a steering control unit of the type shown herein is the capability of the unit to transmit to the vehicle operator, through the steering wheel, external loads which are imposed on the vehicle steering cylinder C. In other words, the vehicle operator will "feel" a load imposed on the steered wheels when the SCU valving is at or near the neutral position, as shown in FIGS. 3 and 4. Referring now to FIG. 4, the group of operating ports 85L includes one port (the uppermost port in FIG. 4) which is in communication with the operating passage 69L when the valving is in neutral. Similarly, one of the group of operating ports 85R (the lower-most port in FIG. 4) is in communication with the operating passage 69R when the valving is in neutral. If an external load is imposed on the steered wheels (e.g., by engaging a curb or a furrow in a field) on the right side of the steered wheels, a pressure pulse is communicated from the steering cylinder C back through the port 27, then through the uppermost of the ports 85L, through the operating passage 69L, then up through the meter ports 83L to the output side of the fluid meter 17. The pressure pulse acting on the meter 17 can be felt by the vehicle operator. At the same time, fluid can be drawn into the other side of the steering cylinder C from the port 29 through the communication between the lowermost of the ports 85R and the operating passage 69R. See the schematic interconnection between the opposite sides of the fluid meter 17 and the ports 27 and 29 in the neutral position in FIG. 1.

By way of example only, it is generally considered desirable to increase the amount of load reaction felt by the operator as the vehicle speed increases, thus increasing the "road-feel", and decreasing the likelihood that the vehicle operator will initiate excessive steering movements, as the vehicle's speed increases. For safety reasons, the chamber 95 and the valve 99 must be vented to the system reservoir R when the vehicle electrical power is off, thus making the entire system "failsafe". Therefore, as the vehicle speed increases, the signal 101 communicated to the pilot control valve 99 is proportionally decreased, decreasing the pressure in the chamber 95 and permitting the biasing of the sleeve 37 toward the right in FIG. 4. In order to achieve variable load reaction, the operating passage 69L includes an angled surface 105L, and similarly, the operating passage 69R includes an angled passage 105R. As the sleeve 37 moves to the right in FIG. 4, with increasing vehicle speed, the uppermost operating port 85L and the lowermost operating port 85R will move to the right, having their communication with the operating passages 69L and 69R, respectively, gradually increased as the ports pass over the angled surfaces 105L and 105R, respectively. Conversely, sufficient leftward movement of the sleeve 37 in FIG. 4 will eliminate fluid communication of each end of the steering cylinder C with its respective side of the fluid meter 17, such that pressure pulses generated in the steering cylinder can no longer be transmitted to the fluid meter 17, and from there to the operator through the steering wheel. Thus it may be seen that load reaction is a function which relates only to rotary neutral operation of the fluid controller.

VARIABLE FLOW AMPLIFICATION

Figure 5:
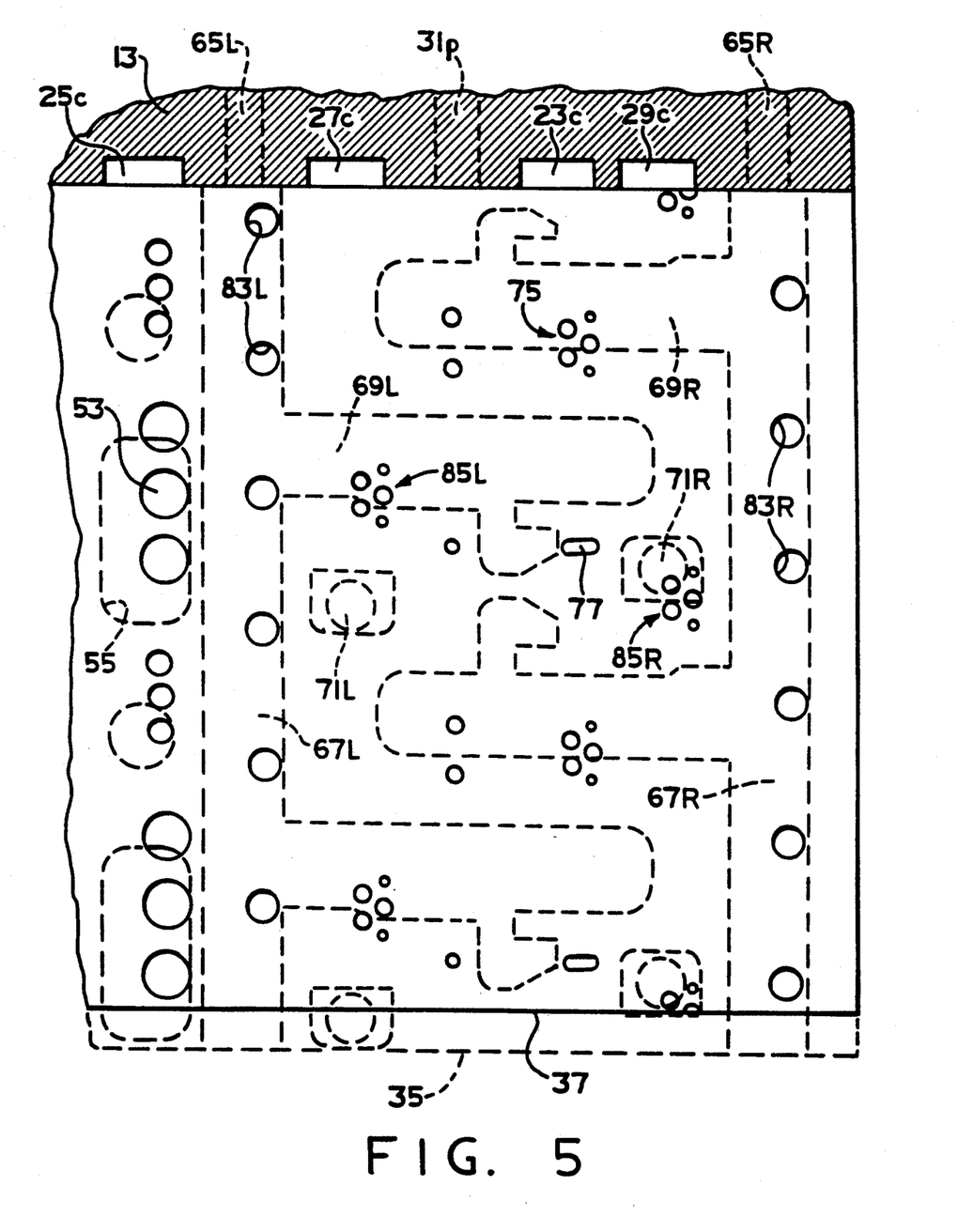
FIG. 5 is an overlay view of the valving, similar to FIG. 3, but on a slightly larger scale than FIG. 3, with the valving in its rotary operating position.

Referring now primarily to FIGS. 5 and 6, the variable flow amplification feature of the present invention will be described. In FIG. 5, there is illustrated the relative positions of the spool 35 and sleeve 37 after the vehicle operator has rotated the steering wheel clockwise, for a right turn, thus moving the spool 35 "downward" in FIG. 5, relative to the sleeve 37. The position illustrated in FIG. 5 may be referred to as a "rotary operating position", although those skilled in the art will understand that particular term does not refer to a single, discrete position, but instead refers to a range of relative rotary positions, as the valving goes through a transition from a neutral rotary position (FIG. 3) toward a maximum rotary displacement position (to be described in connection with FIG. 7).

In FIG. 5, the groups of pressure ports 75 are overlapping their respective operating passages 69R, the cumulative overlap therebetween defining a main variable flow control orifice A1. Pressurized, unmetered fluid flows from the operating passages 69R and through the meter ports 83R, then to the fluid meter 17 in the manner described previously. Metered fluid returning from the fluid meter 17 flows through the meter ports 83L, then through the operating passages 69L, which are now being overlapped by the groups of operating ports 85L, the cumulative overlap therebetween defining a variable flow control orifice A4. The pressurized metered fluid flowing through the A4 orifice flows to the steering cylinder C, with low pressure, exhaust fluid from the cylinder C returning to the fluid controller 11, as was described previously, and flowing through the groups of operating ports 85R, which are now overlapping the tank ports 71R, the cumulative overlap therebetween defining a variable flow control orifice A5. After exhaust fluid flows through the A5 orifice, it flows through the interior of the spool 85, and then to the return port 35 in the manner described Previously. It should be noted that in FIG. 5, the only displacement has been relative rotation between the spool and sleeve, but there has not yet been any axial displacement of the sleeve.

Referring now primarily to FIG. 6, there is a generally L-shaped passage portion 107L in open communication with the operating passage 69L, and similarly, a generally L-shaped passage portion 107R in open communication with the operating passage 69R. Although the passage portions 107L and 107R have been referred to as "generally L-shaped", it should be noted that each passage portions includes an angled surface, the reason for such to be described subsequently. For purposes of further explanation, it will be assumed initially that the variable flow amplification feature is manually selectable by the vehicle operator. In other words, if the operator wishes to have the benefit of the feature, an appropriate input (switch, etc.) is selected by the operator, controlling the pressure in the chamber 95 as appropriate, and the sleeve 37 shifts axially to the left in FIG. 6 to the position shown.

It may be seen by comparing FIGS. 5 and 6 that the description of the main fluid path through the spool and sleeve given in connection with FIG. 5 is also applicable, and is still occurring, in connection with FIG. 6. However, with the sleeve 37 shifted axially as shown in FIG. 6, the flow to the main fluid path (including the fluid meter 17) is "amplified" by the addition of a fluid path which is in parallel with the main fluid path, but which by-passes the fluid meter 17. Fluid amplification is known, in general, from U.S. Pat. No. 4,759,182, issued to Donald M. Haarstad, for a "STEERING CONTROL UNIT WITH FLOW AMPLIFICATION", assigned to the assignee of the present invention and incorporated herein by reference. Fluid controllers with such flow amplification capability are being sold commercially by the assignee of the present invention under the trademark "Q-Amp".

In the above-referenced patent, the flow capacity of the flow amplification path was a direct function of the rotary displacement of the spool and sleeve, as was discussed in the background of the present specification. However, it is one aspect of the flow amplification feature of the present invention that the flow capacity thereof is only partially dependent upon rotational position of the spool and sleeve, and can be varied or controlled in response to some other input parameter while the spool and sleeve are being deflected relative to each other.

With the sleeve 37 shifted to the position shown in FIG. 6, pressurized fluid flowing from the annular chamber 23c flows through the by-pass pressure ports 77, which are now overlapping the passage portions 107L, the cumulative overlap therebetween defining a variable flow amplification orifice AQ. The amplification fluid flowing through the AQ orifice flows into the operating passages 69L, recombining with the main fluid path, described previously, just upstream of the A4 orifice. In other words, the flow amplification feature of the Present invention makes it possible to communicate a quantity of fluid to the steering cylinder C in excess of the fluid capacity of the meter 17. Each of the passage portions 107L and 107R include an angled surface (metering edge) so that the flow area of the orifice AQ is determined by both the axial position of the sleeve 37, and also by the deflection of the spool and sleeve, the amplification orifice AQ cannot approach its maximum area, regardless of the magnitude of the input signal 101, when there is relatively little deflection between the spool and sleeve.

Hereinafter, the overlap between the pressure ports 75 and the operating passages 69R will be referred to as a main, variable flow control orifice Alr, the "r" referring to the formation of an orifice in response to relative rotation between the spool and sleeve. Thus, the variable flow control orifice Al (total) is the sum of Alr and the flow amplification orifice AQ.

Rather than having the variable flow amplification feature manually selected by the vehicle operator, another mode of applying the feature, by way of example only, is to have the position of the sleeve 37 vary as a function of vehicle speed. Typically, it would be desirable to have the sleeve 37 shift axially to the position shown in FIG. 6 as soon as there is relative rotation between the spool and sleeve, away from the rotary neutral position of FIG. 3. Thus, the flow amplification would be maximum, at minimum vehicle speeds, such as when maneuvering a construction vehicle around a worksite. Then, as vehicle speed increases, the electrical signal 101 changes, whereby the sleeve 37 is gradually shifted to the right in FIG. 6, decreasing the area of the flow amplification orifice AQ. For a vehicle which is occasionally driven at relatively higher, transport speeds, the sleeve 37 may be shifted all the way to the position shown in FIG. 5, in which there is no flow amplification, and the only steering flow to the steering cylinder C is that resulting from the normal rotary displacement between the spool and sleeve. The flow amplification function could also be utilized as part of a steered wheel-to-steering wheel position control system, utilizing the control logic taught in the above incorporated U.S. Ser. No. 703,318, now U.S. Pat. No. 5,115,640. In such a system, the axial position of the sleeve 37, and thus, the area of the flow amplification orifice AQ would be varied to maintain the desired relationship between the steered wheels and the steering wheel.

Figure 7:
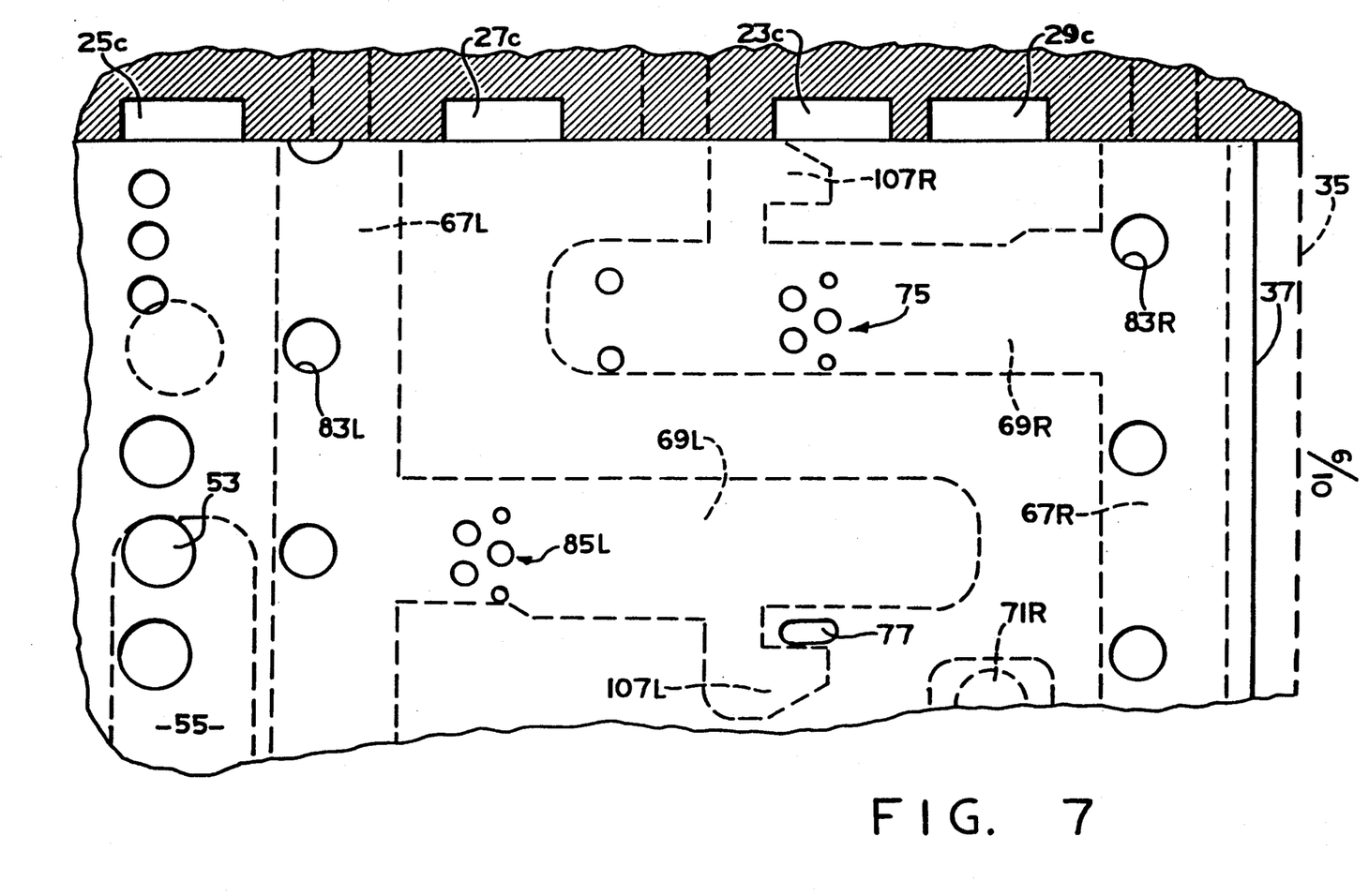
FIG. 7 is an overlay view, similar to FIG. 6, and on the same scale, but with the valving displaced to its

Referring now to FIG. 7, the valving is illustrated with the sleeve 37 in the same axial position as shown in FIG. 6, but with the spool 35 now rotated to its maximum rotary position. As is known to those skilled in the art, the spool and sleeve are typically in the maximum rotary position only when the operator is engaged in a manual steering operation, i.e., the fluid meter 17 is not being used to merely "measure" fluid to the cylinder C, but instead, the manual rotation of the steering wheel by the vehicle operator is causing the meter 17 to operate as a hand pump. As is also well known, it is necessary, when operating in the manual steering mode, to discontinue any flow amplification path which by-passes the fluid meter 17, because such a by-pass path would merely serve as a "short-circuit", and it would not be possible for the vehicle operator to build pressure manually on the output side of the fluid meter 17. The above is described and illustrated in greater detail in U.S. Pat. No. 4,862,690, issued to Donald M. Haarstad, for a "STEERING CONTROL UNIT WITH BOTH FLOW AMPLIFICATION AND MANUAL STEERING CAPABILITY", assigned to the assignee of the present invention and incorporated herein by reference.

Thus, in FIG. 7, when the spool and sleeve are in the maximum rotary position, the group of pressure ports 75 is totally overlapping the operating passages 69R, to minimize the restriction to flow of fluid being drawn into the fluid meter 17 (now operating as a pump). At the same time, the configuration of the passage portions 107L and 107R is such that the by-pass pressure ports 77 are no longer in communication therewith, thus reducing to zero the flow area of the flow amplification orifice AQ. The position of the spool and sleeve in FIG. 7 therefore represents, at the same time, the maximum relative rotation between the spool and sleeve, and nearly the maximum axial displacement of the sleeve. Note the position of the drive pin 53 in the upper left hand corner of the pin opening 55, and compare that Position to the position of the pin 53, within the opening 55 in FIG. 3. It should be noted that in the subject embodiment, and by way of example only, the manual steering position shown in FIG. 7 occurs at a relative rotation of the spool and sleeve of at least about 30 degrees, such that the subject embodiment may be referred to as "wide angle" valving in accordance with the teachings set forth in U.S. Pat. No. 5,080,135, issued to Dwight B. Stephenson, for a "LARGE DEFLECTION ANGLE ROTARY MODULATION STEERING VALVE", assigned to the assignee of the present invention and incorporated herein by reference. However, it should be clearly understood that the use and application of the present invention is in no way limited to fluid controllers having valving of the "wide angle" type.

VARIABLE DAMPING

Figures 8, 8A, 8B:
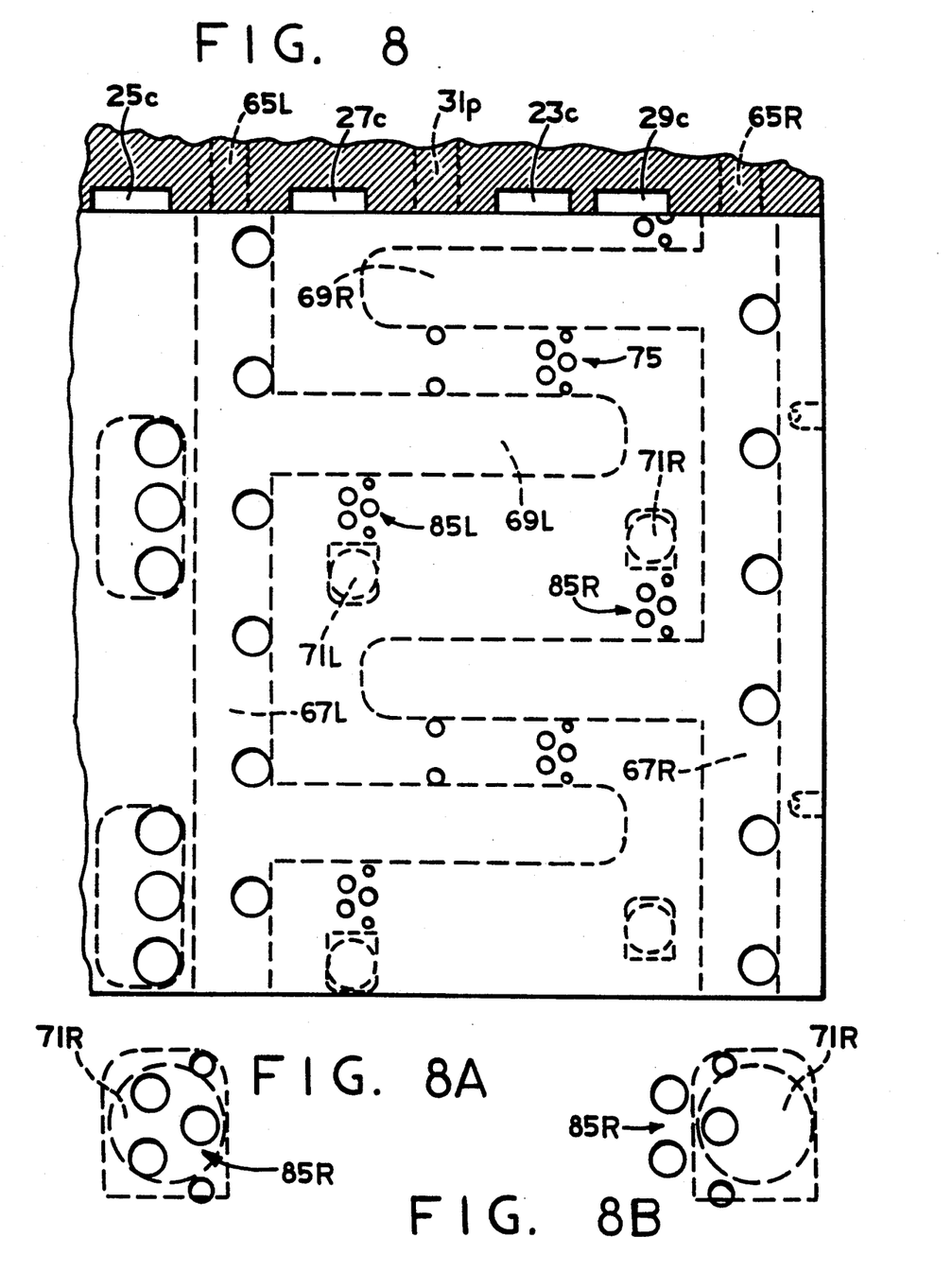
FIG. 8 is an overlay view of an alternative embodiment of the valving shown in FIG. 3, and on a slightly larger scale than in FIG. 3, illustrating the damping aspect of the present invention.
FIGS. 8A and 8B are fragmentary views, similar to FIG. 8, but with the spool and sleeve rotatably displaced, and on a larger scale, illustrating the sleeve in its first and second axial positions, respectively.

Referring now to FIG. 8, there is illustrated somewhat of an alternative embodiment wherein, for simplicity, the variable load reaction and variable flow amplification features described previously have been eliminated. Another change is that, in FIG. 8, the tank ports 71L and 71R are illustrated as being somewhat narrower, in the axial direction, than was the case in the embodiment of FIGS. 3 through 7. Finally, the position of the groups of operating ports 85L and 85R has been changed somewhat relative to the tank ports 71L and 71R, respectively, for reasons which will become apparent subsequently.

As used herein, the term "damping" relates to restricting the flow through the variable flow control orifice A5 in such a way as to increase the total Pressure drop across the fluid controller 11. By way of example only, the variable damping feature (also referred to as "active damping") may eliminate the need for a cushion valve disposed in parallel between the lines interconnecting the cylinder ports 27 and 29 and the opposite ends of the steering cylinder C. It will be understood that subsequent references to increasing damping imply further restriction of the A5 orifice, thus "cushioning" or slowing down the actuation of the steering cylinder C by the increasing restriction of the flow out of the cylinder, and eventually to the system reservoir R.

Referring now primarily to FIG. 8A, if the spool 35 is rotated, such as for a right turn, at a rate such that the spool is displaced, relative to the sleeve, to a normal operating position, the operating ports 85R will be overlapping the tank ports 71R, the cumulative overlap therebetween defining the variable flow control orifice A5, as was explained in connection with FIG. 5.

By way of example only, one typical application for the variable damping feature would be to sense the position of the steering cylinder C, and as the piston within the cylinder C approaches the end of its stroke, an appropriate signal would be sent to the controller 103 to begin shifting the sleeve 37 from its first position shown in FIGS. 8 and 8A, toward the left.

Referring now primarily to FIG. 8B, as the sleeve is shifted to the left, several of the ports within the group of operating ports 85R are moved out of communication with the respective tank port 71R, thus reducing the flow area of the A5 orifice, and damping or cushioning further movement of the steering cylinder C. As a result, the movement of the piston within the steering cylinder C will slow down as the piston reaches the end of its stroke, even as the operator continues to rotate the steering wheel at the same speed.

Referring again primarily to FIG. 8, it may be seen that in the event of a left turn, wherein the spool would move "upward" relative to the sleeve in FIG. 8, the variable flow control orifice A5 would be defined by the overlap of the group of operating ports 85L and the tank ports 71L. Leftward movement of the sleeve 37 would have substantially the identical effect on the area of the A5 orifice during a left turn as during a right turn.

ALTERNATIVE EMBODIMENT—FIGS. 9-11

Figure 9:
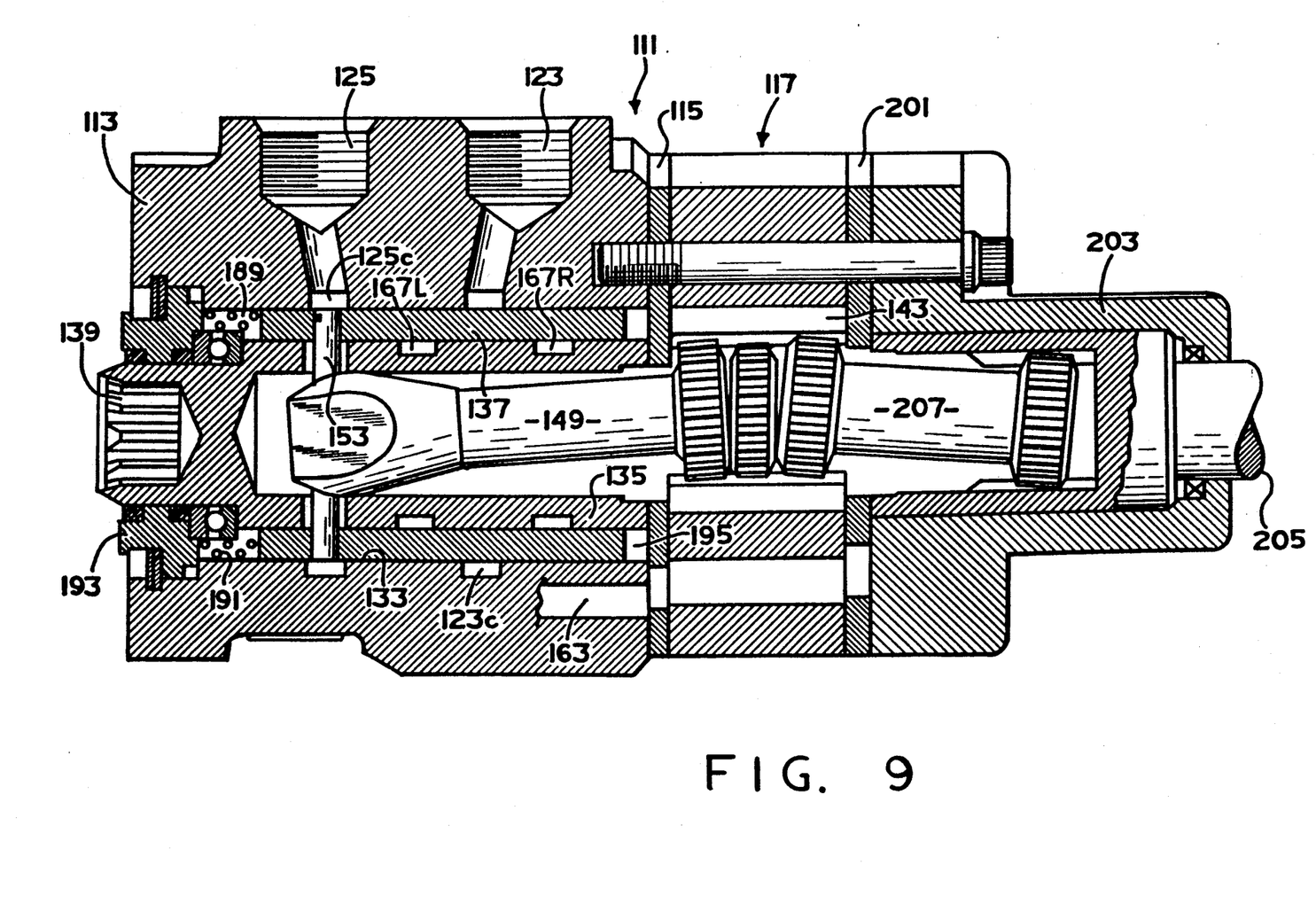
FIG. 9 is an axial cross-section of a torque generator made in accordance with the teachings of the Present invention.

Referring now primarily to FIG. 9, there is illustrated an alternative embodiment of the present invention, which is a torque-generating steering device, referred to hereinafter as simply a "torque generator". In the alternative embodiment, there are many elements which are quite similar in function or construction to elements of the embodiment of FIGS. 1 through 8. Such elements will bear the same reference numeral as in the primary embodiment, plus "100", to simplify and shorten the description of the alternative embodiment. Elements in the alternative embodiment for which there are no corresponding elements in the primary embodiment bear reference numerals in excess of "200".

Therefore, the alternative embodiment illustrates a torque generator 111 including a valve housing 113, a port plate 115, a fluid meter 117, a wear plate 201, and a shaft support casing 203. An output shaft 205 is rotatably supported within the casing 203, and in turn, the shaft 205 may be linked or connected to any suitable steering device, such as a pinion gear of a rack and pinion steering apparatus (not shown).

Torque generators of the general type shown in FIG. 9 have been in commercial use for many years, are well known to those skilled in the art, are illustrated and described in greater detail in U.S. Pat. No. 5,042,250, assigned to the assignee of the present invention, and incorporated herein by reference.

The housing 113 defines an inlet port 123 and a return port 125. The housing 113 further defines a valve bore 133, and a plurality of axial bores 163, each of which is in fluid communication with one of the expanding or contracting fluid volume chambers of the fluid meter 117.

Disposed within the bore 133 is a primary, spool valve 135, and a follow-up, sleeve valve 137. Orbital and rotational movement of a star 143 of the fluid meter 117 is transmitted by means of a main drive shaft 149, and then through a pin 153 to provide the follow-up movement to the sleeve 137. At the same time that the fluid meter 117 is acting to "measure" the flow of fluid therethrough, and provide follow-up movement to the sleeve 137, a torque is being transmitted from the star 143 by means of a dogbone shaft 207 to the output shaft 205, in a known manner.

The spool 135 defines a set of internal splines 139 for connection to a vehicle steering wheel (not shown) and disposed between that portion of the spool 135 and the adjacent portion of the housing 113 is a bearing retainer 193. The bearing retainer 193 cooperates with the housing 113 and the left end (in FIG. 9) of the sleeve 137 to define a spring chamber 189, within which is disposed a plurality of coiled, compression springs 191, tending to bias the sleeve 137 to the right in FIG. 9. The right end of the sleeve 137 cooperates with the housing 113 and the plate 115 to define an annular pressure chamber 195. Preferably, a regulated tank pressure is communicated into the chamber 195, and controlled, in the same manner as in the primary embodiment.

Figure 10:
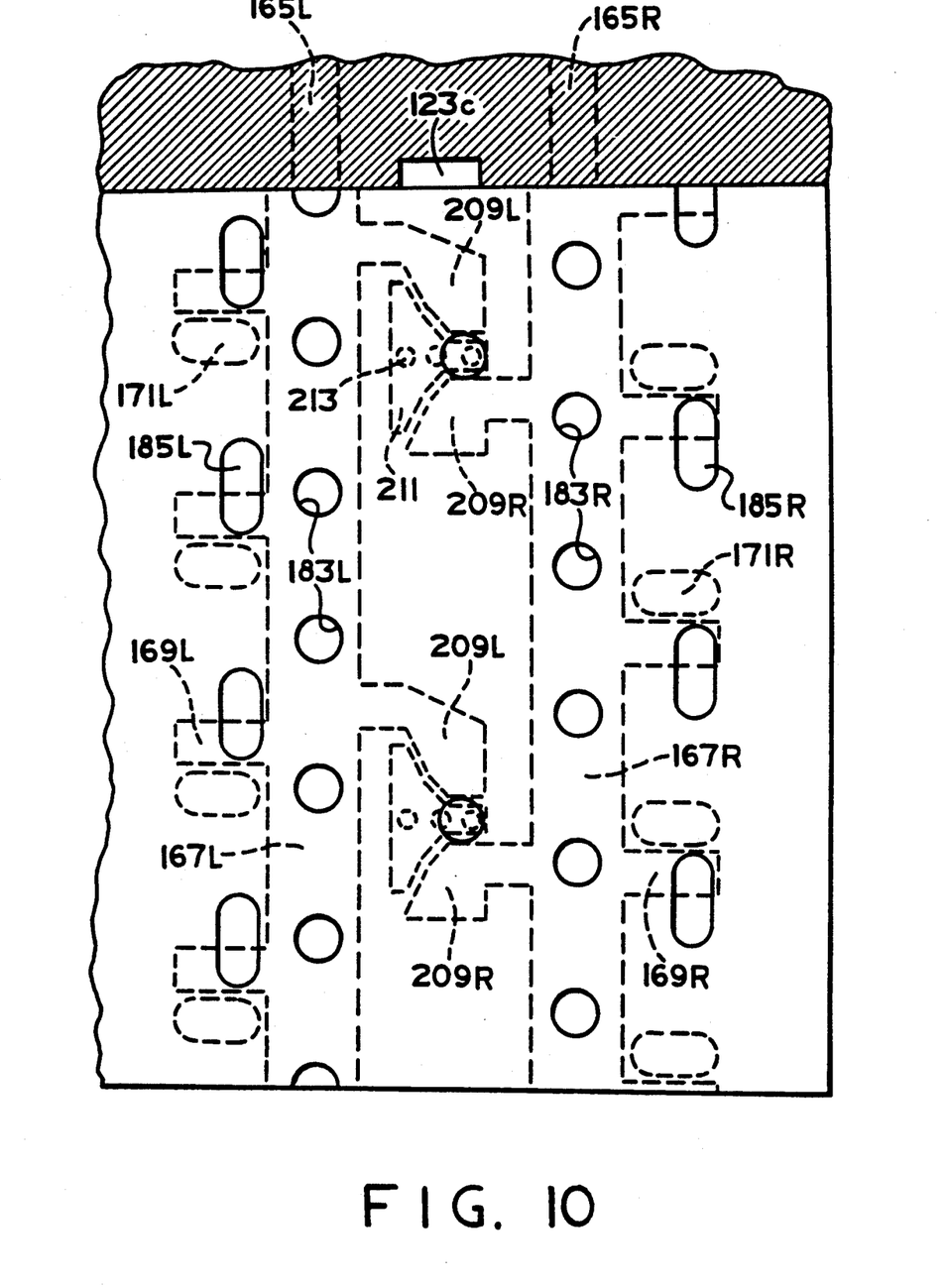
FIG. 10 is an overlay view of the valving of the torque generator shown in FIG. 9, but on a larger scale than in FIG. 9, with the valving illustrated in its rotary neutral position, and its first axial position.

Referring now primarily to FIG. 10, the housing 113 defines an annular chamber 123c in continuous fluid communication with the inlet port 123. The housing 113 also defines an annular chamber 125c (see FIG. 9) in continuous fluid communication with the return port 125. Referring again to FIG. 10, there is a radial bore 165L and a radial bore 165R in communication with each of the axial bores 163, to provide commutating fluid communication in a manner well known to those skilled in the art. The spool 135 defines a pair of annular meter grooves 167L and 167R. In communication with the groove 167L is a pair of pressure passages 209L, and in communication with the groove 167R is a pair of pressure passages 209R. Also in communication with the groove 167L is a plurality of operating passages 169L, and similarly, in communication with the groove 167R is a plurality of operating passages 169R. Disposed circumferentially adjacent each operating passage 169L or 169R, is a tank port 171L or 171R, respectively.

Disposed circumferentially between each pair of pressure passages 209L and 209R is a neutral recess, generally designated 211 which is formed only on the surface of the spool 135. The recess 211 is in communication with the interior of the spool 135 by means of a plurality of neutral passages 213, the function of which will be described subsequently.

Figure 11:
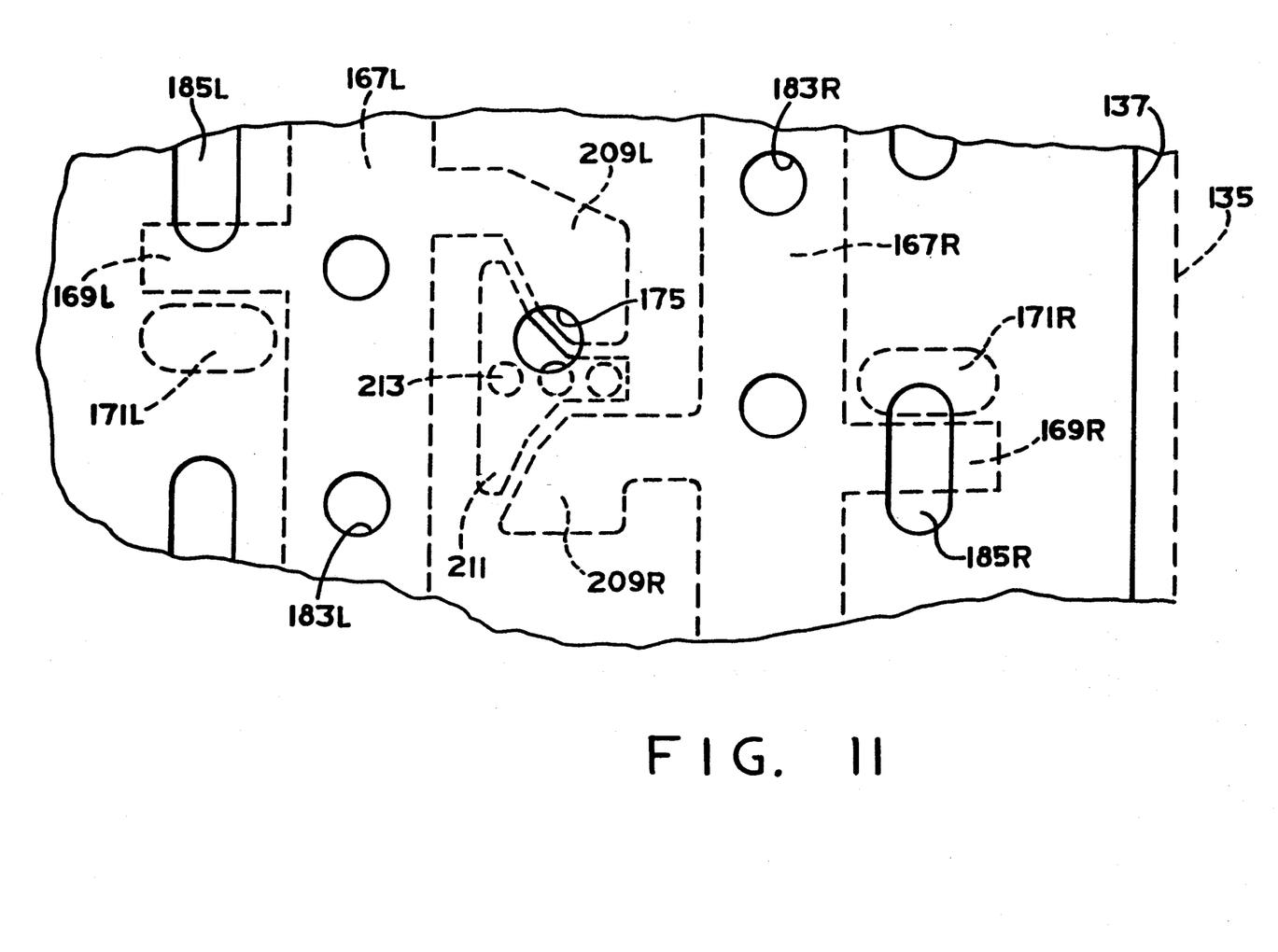
FIG. 11 is an enlarged, fragmentary, overlay view similar to FIG. 10, with the valving displaced in both the rotary and axial directions.

The sleeve 137 defines a pair of pressure ports 175 (the reference numeral appearing only in FIG. 11). The sleeve 137 further defines a plurality of meter ports 183L, and a plurality of meter ports 183R being disposed in open communication with the annular meter grooves 167L and 167R, respectively. The sleeve 137 also defines a plurality of operating ports 185L and a plurality of operating ports 185R. As may best be seen in FIG. 10, with the spool 135 and sleeve 137 in the relative neutral position, in the rotational direction, as shown in FIG. 10, each of the operating ports 185L or 185R is in relatively unrestricted communication with its adjacent operating passages 169L or 169R, respectively. The torque generator illustrated in FIGS. 9 through 11 would be considered "open-center" because, with the spool 135 in the neutral position, as shown in FIG. 10, pressurized fluid entering through the inlet port 123 flows through the pressure ports 175, then flows through the respective neutral recess 211, and through the neutral passages 213 to the system reservoir R. The cumulative overlap between the pressure ports 175 and the neutral recesses 211 defines a neutral flow control orifice AN.

Referring now primarily to FIG. 11, as the spool 135 is rotated relative to the sleeve 137, each pressure Port 175 begins to communicate with its respective pressure passage 209L (assuming a right turn), the cumulative overlap therebetween defining a variable flow control orifice A1. As the area of the orifice A1 increases, the area of the neutral flow control orifice AN decreases, and with continued rotation of the spool 135, pressure begins to build across the AN orifice, as is well known to those familiar with open-center devices.

If the sleeve 137 would remain biased to the right, as in FIG. 10, rotary displacement of the spool 135 would cause the A1 orifice to begin to open rapidly. Such rapid opening of the A1 orifice, and closing of the AN orifice would result in steering action immediately, thus limiting the deflection of the spool and sleeve which would occur before actuation of the meter, and quickly regaining steering wheel-to-steered wheel correlation. Such a performance characteristic is typically quite acceptable at relatively low vehicle speeds. However, as the vehicle speed increases, it is desirable in many vehicle applications to "stretch out" the area versus displacement curves for the AN and A1 orifices. Therefore, at relatively higher vehicle speeds, small, sudden corrections (movements) of the vehicle steering wheel do not cause quick changes in vehicle direction, thus aiding vehicle stability. Therefore, and by way of example only, as the vehicle speed increases, the sleeve 137 is biased to the left in FIG. 11, with the pressure port 175 being moved to the left, to a position in which greater rotational displacement of the spool 135 is required before the A1 orifice achieves a given flow area.

Pressurized fluid flowing through the A1 orifice flows through the passage 209L, then through the meter groove 167L, through the meter ports 183L to the fluid meter 117. Low pressure fluid flows through the meter ports 183R, then flows through meter groove 167R, then into the operating passages 169R. The low pressure fluid flows up through the operating ports 185R, defined by the sleeve 137, which are now overlapping the tank ports 171R, the cumulative overlap therebetween defining a variable flow control orifice A5.

Thus, it may be seen that the present invention provides a hydrostatic power steering device in which the primary and follow-up valve members are displaced from a neutral rotary position to a rotary operating position, thereby defining a main fluid path which communicates between the inlet port and the return port, and through the fluid meter. The spool defines a passage means and the sleeve defines a port means, the passage means and the port means defining a variable flow control orifice A. It should be understood that the reference hereinabove to a flow control orifice A is a generic reference intended to refer to any of the various flow control orifices A1, A4, A5, AQ, and AN, described previously in connection with either of the embodiments of the invention. Flow control orifice A has an orifice area versus deflection relationship when the sleeve is in its first axial position, as shown in FIGS. 5 and 10. The fluid passage means and and the fluid port means are configured such that the flow control orifice A has a second area versus deflection relationship when the sleeve is in a second axial position, as shown in FIGS. 6 and 11. It is one important aspect of the present invention that the difference between the first and second area versus deflection relationships provides a useful steering or ancillary function which extends the capability of the steering device.

It is another important aspect of the present invention to provide a steering device having one or more steering or ancillary functions (load reaction, flow amplification, damping) wherein the effect of the function can be varied by displacing the sleeve axially from a first position of the sleeve toward a second position of the sleeve, independent of the direction of rotational displacement of the spool and sleeve. In other words, a certain amount of active damping of the A5 orifice can be achieved by a certain axial movement of the sleeve, without having to take into account, in the physical device or in the system logic, whether a left turn or a right turn is occurring.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

I claim:

1. A hydrostatic power steering device operable to control the flow of fluid from a source of pressurized fluid, said device being of the type including housing means defining an inlet port for connection to the source of fluid, and a return port; valve means disposed in said housing means and comprising a primary, rotatable valve member and a cooperating, relatively rotatable follow-up valve member, said primary and follow-up valve members defining a neutral rotary position and a rotary operating position in which said primary valve member is rotatably displaced from said neutral rotary position, relative to said follow-up valve member; said housing means and said valve means cooperating to define a main fluid path communicating between said inlet port and said return port when said valve members are in said valve members are in said rotary operating position; fluid actuated means for imparting follow-up movement to said follow-up valve member in response to the flow of fluid through said fluid actuated means, said fluid actuated means being disposed in series flow relationship in said main fluid path between said inlet port and said return port; said follow-up valve member defining a first axial position; said primary valve member defining fluid passage means said follow-up valve member defining fluid port means, said fluid passage means and said fluid port means being disposed to define a variable flow control orifice having a first area versus deflection relationship as said primary and follow-up valve members are displaced between said neutral rotary position and said rotary operating position, when said follow-up valve member is in said first axial position; characterized by:
 (a) means operable, to bias said follow-up valve member toward said first axial position;
 (b) means operable to displace said follow-up valve member from said first axial position toward a second axial position; and
 (c) one of said fluid passage means and said fluid port means being configured such that said variable flow control orifice has a second area versus deflection relationship as said primary and follow-up valve members are displaced between said neutral rotary position and said rotary operating position, when said follow-up valve member is in said second axial position .

2. A hydrostatic power steering device as claimed in claim 1, characterized by said main fluid path including said variable flow control orifice in series flow relationship therein.

3. A hydrostatic power steering device as claimed in claim 1, characterized by one of said fluid passage means and said fluid port means being configured such that, for any given rotary position displacement of said follow-up valve member from said first axial position toward said second axial position increases the flow area of said variable flow control orifice.

4. A hydrostatic power steering device as claimed in claim 1, characterized by one of said fluid passage means and said fluid port means being configured such that, for any given rotary position displacement of said follow-up valve member from said first axial position toward said second axial position decreases the flow area of said variable flow control orifice.

5. A hydrostatic power steering device as claimed in claim 1, characterized by said fluid passage means and a neutral passage; said fluid port means and said neutral passage cooperating to define a neutral flow control orifice, and said fluid port means and said pressure passage cooperating to define a pressure flow control orifice.

6. A hydrostatic power steering device as claimed in claim 5, characterized by said fluid port means, said pressure passage and said neutral passage being configured such that, for any given rotary position of said primary and follow-up valve members, displacement of said follow-up valve member from said first axial position toward said second axial position increases the flow area of said neutral flow control orifice, and decreases the flow area of said pressure flow control orifice.

7. A controller operable to control the flow of fluid from a source of pressurized fluid to a fluid pressure operated device; said controller being of the type including housing means defining an inlet port for connection to the source of pressurized fluid, a return port, and first and second control fluid ports for connection to the fluid pressure operated device; valve means disposed in said housing means and comprising a primary, rotatable valve member and a cooperating, relatively rotatable follow-up valve member, said primary and follow-up valve members defining a neutral rotary position and a rotary operating position in which said primary valve member is rotatably displaced from said neutral rotary position, relative to said follow-up valve member; said housing means and said valve members cooperating to define a main fluid path providing fluid communication from said inlet port to said first control fluid port and from said second control fluid port to said return port, when said valve members are in said rotary operating position; said follow-up valve member defining a first axial position; said primary valve member defining fluid passage means, and said follow-up valve member defining first fluid port means in continuous fluid communication with said inlet port, second fluid port means in continuous fluid communication with said first control fluid port, and third fluid port means in continuous fluid communication with said second control fluid port; said first, second, and third fluid port means being blocked from substantial fluid communication with said fluid passage means, when said valve members are in said neutral rotary position, and in fluid communication with said fluid passage means, when said valve members are in said rotary operating position, to define therebetween first, second, and third variable flow control orifices, respectively; said main fluid path including said first, second, and third variable flow control orifices; characterized by:
 (a) means operable to bias said follow-up valve member toward said first axial position;
 (b) means operable to displace said follow-up valve member from said first axial position toward a second axial position;
 (c) one of said first and third fluid port means being configured such that, for any given rotary operating position, displacement of said follow-up valve member from said first axial position toward said second axial position changes the flow area of the respective one of said first and third variable flow control orifices.

8. A controller as claimed in claim 7, characterized by said first fluid port means being configured such that, for any given rotary operating position, displacement of said follow-up valve member from said first axial position toward said second axial position increases the flow area of said first variable flow control orifice.

9. A controller as claimed in claim 7, characterized by said fluid passage means comprising said primary valve member defining first, second, and third fluid passages, said first, second, and third fluid port means being in fluid communication with said first, second, and third fluid passages, respectively, when said valve members are in said rotary operating position, to define said first, second, and third variable flow control orifices.

10. A controller as claimed in claim 9, characterized by said first port means including a flow amplification port blocked from fluid communication when said valve members are in said first axial position, and operable to be in fluid communication with said second fluid passage when said valve members are in said rotary operating position, and said follow-up valve member is in said second axial position.

11. A controller as claimed in claim 10, characterized by fluid actuated means for imparting rotary follow-up movement to said follow-up valve member, relative to said primary valve member, proportional to the volume of fluid flow through said main fluid path, when said valve members are in said rotary operating position.

12. A controller as claimed in claim 7, characterized by said third fluid port means being configured such that, for any given rotary operating position, displacement of said follow-up valve member from said first axial position toward said second axial position decreases the flow area of said third variable flow control orifice.

13. A controller as claimed in claim 12, characterized by said fluid passage means comprising said primary valve member defining first, second, and third fluid passages, said first, second, and third fluid port means being in fluid communication with said first, second, and third fluid passages, respectively, when said valve members are in said rotary operating position, to define said first, second, and third variable flow control orifices.

14. A controller as claimed in claim 13, characterized by said third port means comprising a plurality of individual ports in close proximity to each other, all of said individual ports being in fluid communication with said third fluid passage when said valve members are near a maximum displacement position, at least a portion of said individual fluid ports being blocked from fluid communication with said third fluid passage as said follow-up valve member moves from said first axial position toward said second axial position.

15. A controller operable to control the flow of fluid from a source of pressurized fluid to a fluid pressure operated device; said controller being of the type including housing means defining an inlet port for connection to the source of pressurized fluid, a return port, and first and second control fluid ports for connection to the fluid pressure operated device; valve means disposed in said housing means and comprising a primary, rotatable valve member and a cooperating, relatively rotatable follow-up valve member, said primary and follow-up valve members defining a neutral rotary position and a rotary operating position in which said primary valve member is rotatably displaced from said neutral rotary position, relative to said follow-up valve member; said housing means and said valve members cooperating to define a main fluid path providing fluid communication from said inlet port to said first control fluid port and from said second control fluid port to said return port, when said valve members are in said rotary operating position; said follow-up valve member defining a first axial position; said follow-up valve member defining a first fluid port in continuous fluid communication with said inlet port, a second fluid port in continuous fluid communication with said first control fluid port, and a third fluid port in continuous fluid communication with said second control fluid port, said first, second, and third fluid ports comprising part of said main fluid path when said valve members are in said rotary operating position; fluid actuated means for imparting rotary follow-up movement to said follow-up valve member, relative to said primary valve member, proportional to the volume of fluid flow through said main fluid path, when said valve members are in said rotary operating position, characterized by:
(a) means operable to bias said follow-up valve member toward said first axial position;
(b) means operable to displace said follow-up valve member from said first axial position toward a second axial position;
(c) said second and third fluid ports being configured such that, when said valve members are in said neutral rotary position and said first axial position, said second and third fluid ports are in fluid communication with said device and with said fluid actuated means; and
(d) said second and third fluid ports further being configured such that, when said valve members are in said neutral rotary position and said follow-up valve member is displaced toward said second axial position, said fluid communication of said second and third fluid ports with said device and with said fluid actuated means, is gradually restricted.

16. A controller as claimed in claim 15, characterized by said second and third fluid ports being configured such that, when said valve members are in said neutral rotary position and said follow-up valve member is in said second axial position, said fluid communication of said second and third fluid ports with said device and with said fluid actuated means is blocked.

* * * * *